Patented Apr. 28, 1942

2,280,998

UNITED STATES PATENT OFFICE 2,280,998

ALUMINA RECOVERY PROCESS

Ralph Waldo Brown, East St. Louis, Ill., assignor to Aluminum Company of America, Pittsburgh, Pa., a corporation of Pennsylvania No Drawing. Application April 13, 1940, Serial No. 329,538

6 Claims. (Cl. 23—143)

This invention relates to the treatment of aluminous ores (i. e., alumina-bearing ores) for recovering alumina values therefrom, particularly to the Bayer and like processes, in which recovery of alumina from bauxite and similar alumina-bearing materials is achieved by digestion of the ore with caustic liquor; the major portion of the alumina values being thereby dissolved by the liquor and the major portion of the unwanted ore constituents remaining undissolved so as to be separable from the liquor.

When in processes of the nature indicated the aluminous ore, usually bauxite, is digested with an aqueous solution of caustic, say caustic soda, or caustic soda and sodium carbonate, the resulting slurry consists of a substantially unstable solution of alumina in which are suspended or carried particles of the insoluble constituents of the ore. At this stage certain difficulties are encountered, arising from two factors long believed unavoidable in processes of the Bayer type: first, the instability of the alumina solution, which instability is a disadvantage in the separation of the insoluble non-aluminous particles but is a very advantageous property, in fact a necessary property from the standpoint of efficiency, when, after separation of the insolubles, alumina is to be precipitated from the solution; and second, the finely divided state in which the insolubles exist in the slurry. The first of these gives rise to the possibility of alumina being prematurely precipitated and thus being removed along with the non-aluminous particles. The second introduces difficulties in the separation step of the process.

The general methods of separating insolubles from liquids in which they are suspended are two—filtration, and sedimentation and decantation. Both have been proposed and used in processes of the Bayer type, the first with notable success, the second with limited and in many cases doubtful success. The desideratum is not alone one of effective separation but is also one of separation at low cost. The commercial operations are all of large magnitude, and effective separation is not attractive unless that separation be accomplished economically. Filtration has been the method commonly used to effect commercial separation of the insolubles, often called "red mud," from the unstable solution, which is usually referred to as the "liquor." The filtering material best suited to the purpose is cloth, yet cloth deteriorates rapidly by reason of the causticity of the solution, especially when the causticity is high, and the cloth may be impaired by impurities in the ore, as for instance ferrous iron. The finely subdivided solids rapidly fill the interstices of the cloth, with consequent slowing up and hence impairment of the efficiency of the filtering operation. Also, the unstable tendencies of the liquor may cause precipitation on the cloth of small amounts of alumina which in turn act as "seed" and tend to increase precipitation in the solution passing through the cloth. Despite these difficulties, filtration methods have remained the most economical and efficient means previously used for the separation of the insoluble red mud from the liquor.

Processes of sedimentation and decantation, with subsequent washing of the residues therefrom, to recover all soluble values have proved satisfactory in the treatment of other slurries or slimes but have not previously found any noted success as a substitute for filtration methods in the processes here under discussion. The necessarily long settling periods are not compatible with the unstable nature of the liquor and thus large losses of alumina values occur because of premature precipitation. While one such sedimentation process, with countercurrent washing of the residues, allegedly predicates success upon adjustment of solution density and of the ratio existing therein between $Na_2O$ (or NaOH) and $Al_2O_3$, in an attempt to prevent premature precipitation, the process has found little commercial application and then only with limited success in connection with slurries derived from the treatment of a few types of ore.

The present invention has for its chief object the provision, for recovering alumina values, of a simple and economical process in which the difficulties outlined above are in large measure overcome. Another object is to provide, for the purpose indicated, a process in which the solution or liquor produced by digestion of the ore with caustic is stable while the separation of the undissolved materials is being effected, without, however, destroying the capability of efficient precipitation of alumina from the solution later. I have found that in general these and other objects can be attained by providing in the slurry a suitable quantity of starch, preferably by adding it to the liquor before the digestion; my discovery being that if the starch does not greatly exceed the amount required for efficient separation or removal of the insolubles it will nevertheless also afford adequate stabilizing of the liquor, and that in general enough of the starch, preferably substantially all of it, can be removed along with the insolubles to give the liquor the instability which is necessary for efficient recovery of dissolved alumina. In other words, by my invention it is possible not merely to take advantage of the flocculating or coagulating effect of the starch and take advantage of its capability of inhibiting precipitation of alumina during removal of the suspended insolubles, but to obtain also the desirable sensitivity of the liquor to conditions under which alumina is precipitated after removal of the flocculated particles. Refined starch is preferred but impure starch-bearing materials may be used, including such materials as corn meal, wheat flour, rice flour, potatoes, etc.

It is a notable feature of the invention that in general it can be applied to advantage in conjunction with prior practices of the Bayer principle without material variation, if any, of such specific details as the concentration of the caustic solution used for digestion, the temperature at which the digestion is effected, and the duration of the digestion. In other words, the user can continue to employ digestion processes which by experience and research have been found to be efficient and which he may therefore be reluctant to change.

I have found, however, that exposure of even pure starch to a temperature much above about 150° C. has an adverse effect upon the desirable property of flocculating the undissolved particles which are suspended in the solution. Hence, if the starch is to be added before digestion it is advisable, even with pure starch, to run the digestion at a temperature not over 150° C., or, if for some reason it is desirable to digest the ore at a higher temperature, the starch should be added to the slurry after digestion and at reduced temperatures—and in some cases at considerably lower temperature when less pure varieties of starch are employed.

The amount of starch needed to secure a substantial advantage appears to be in general about 0.01 to 0.2 gram of starch per liter of digest solution, but more may be desirable in some cases, having due regard to such factors as the amount and nature of the soluble aluminous and insoluble non-aluminous material in the ore, as found by the analysis or analyses which would be made anyhow to provide the information needed as a basis for determining the causticity of the treating solution, the temperature of treatment, and other factors of importance, in processes of the Bayer type. In determining the amount of starch needed for a given ore, the operator should keep in mind that although the presence of starch in the digestion step has a desirable stabilizing effect and may therefore suggest the use of a higher causticity, or a higher temperature, or other condition which might give a greater alumina-dissolving power, the amount of starch should in general be but little, if any, more than can be removed along with the insoluble particles in the liquor. Otherwise the residual stabilizing effect may be too great for the desired efficient precipitation of alumina.

As a specific example of my process, finely ground bauxite having a silica content of about 2 to 6 per cent is digested at 145° C. with caustic solution containing 0.05 gram of starch per liter, and enough NaOH, depending in general upon the alumina content of the ore, to produce a liquor containing 90 grams of $Al_2O_3$ per liter. After digestion the starch and the flocculated undissolved particles are removed by filtration, or, preferably, by sedimentation and decantation. In the latter case the liquor with the suspended particles is passed to one or more settling tanks to which it is delivered at a temperature around 125° C. The temperature may decrease more or less during the settling operation, in which starch also settles out. In the separation step the stability imparted to the alumina solution by the starch allows proper handling of the liquor and the flocculating effect of the starch reduces the settling time and increases the efficiency of the operation. From the settling tank the liquor is drawn off, passed, if desired, through a clearing filter, and then sent to the precipitators for precipitation of alumina, preferably in the manner described in the Fickes reissued Patent No. 13,668. The sediment is withdrawn from the settling tank and may, if desired, be washed in one or more stages to recover soluble values associated therewith.

As stated, it is important that the liquor, after removal of insolubles, be unstable, i. e. embody a tendency to auto-precipitation of alumina—auto-precipitation meaning precipitation of alumina (as hydrate) by hydrolysis of an aluminate solution, in the presence of particulate aluminum hydrate in accordance with the usual Bayer process.

I am aware that there is reason for believing that the "alumina" in solution in the liquor is an aluminate and that the "alumina" precipitated from the liquor is aluminum hydrate; but whatever the solute and the precipitate may actually be, they can be conveniently called alumina, and it is to be understood that the word is so used in the foregoing description and in the appended claims. It is also to be understood that the invention is not limited to the specific details given in the foregoing description but can be practiced in various ways without departure from its spirit as defined by the claims.

I claim:

1. In the art of extracting alumina values from ore containing the same, which includes digesting the ore by treating it with caustic solution to produce a slurry consisting of liquor containing dissolved alumina with insoluble particles suspended therein, removing insoluble particles and thereafter precipitating alumina from the liquor, the improvement which comprises, prior to the precipitation of alumina, providing starch in said slurry in an amount which will effect flocculation of the suspended insoluble particles but not sufficient to interfere with auto-precipitation of alumina after flocculation and removal of suspended insoluble particles, and removing starch from the liquor, along with the suspended insoluble particles, to an extent leaving the liquor unstable to auto-precipitation.

2. In the art of extracting alumina values from ore containing the same, which includes digesting the ore by treating it with caustic solution at temperatures not exceeding about 150° C. so as to produce a slurry consisting of liquor containing dissolved alumina with insoluble particles suspended therein, removing insoluble particles and thereafter precipitating alumina from the liquor, the improvement which comprises, prior to the precipitation of alumina, providing starch in said slurry in an amount which will effect flocculation of the suspended insoluble particles but not sufficient to interfere with auto-precipitation of alumina after flocculation and removal of suspended insoluble particles, and thereby effecting the desired flocculation of suspended insoluble particles, removing suspended insoluble particles from the alumina solution by sedimentation and decantation, and leaving the solution unstable to auto-precipitation by removing substantially all the starch along with the suspended insoluble particles.

3. In the art of extracting alumina values from ore containing the same, digesting the ore by treating with caustic solution at a temperature not exceeding about 150° C. so as to produce a slurry consisting of a stable liquor containing alumina in solution with flocculated insoluble particles suspended therein, said solution containing starch in sufficient quantity to flocculate the suspended insoluble particles; then separating from the liquor the suspended insoluble particles together with sufficient starch to leave the liquor unstable to auto-precipitation; and precipitating alumina from the liquor by procedure including auto-precipitation.

4. In the art of extracting alumina values from ore containing the same: digesting the ore with a starch-containing caustic solution at a temperature not exceeding about 150° C. and producing thereby a slurry consisting of a stable liquor containing about 90 grams of alumina per liter, with flocculated insoluble particles suspended therein; said solution containing starch in sufficient quantity to flocculate said suspended particles; then separating the suspended insoluble particles and substantially all the starch from the liquor by sedimentation; withdrawing the liquor, left unstable to auto-precipitation by the removal of starch; and precipitating alumina from the liquor by procedure including auto-precipitation.

5. In the art of extracting alumina values from ore containing the same, which includes digesting the ore by treating it with caustic solution to produce a slurry consisting of liquor containing dissolved alumina with insoluble particles suspended therein, removing insoluble particles and thereafter precipitating alumina from the liquor, the improvement which comprises, incorporating in the slurry after the digestion and before removal of suspended particles, starch in an amount which will flocculate the suspended insoluble particles but not sufficient to interfere with auto-precipitation of alumina, and thereafter and prior to the precipitation of alumina, removing starch from the liquor, along with the suspended insoluble particles, to an extent leaving the liquor unstable to auto-precipitation.

6. In the art of extracting alumina values from ore containing the same, which includes digesting the ore by treating it with caustic solution to produce a slurry consisting of liquor containing dissolved alumina with insoluble particles suspended therein, removing insoluble particles and thereafter precipitating alumina from the liquor, the improvement which comprises, incorporating in the liquor, prior to removal of the insolubles, starch in an amount which will flocculate the suspended insoluble particles but not sufficient to interfere with auto-precipitation of alumina and thereafter and prior to the aforesaid precipitation of alumina, separating from the liquor by sedimentation, with the slurry at a temperature of about 125° C., the suspended insoluble particles and enough of the starch to leave the liquor unstable to auto-precipitation.

RALPH WALDO BROWN.